UNITED STATES PATENT OFFICE.

HUGO HASSENCAMP, OF ELBERFELD, PRUSSIA, GERMANY.

MANUFACTURE OF BENZYLATED ACID VIOLET.

SPECIFICATION forming part of Letters Patent No. 331,965, dated December 8, 1885.

Application filed July 9, 1885. Serial No. 171,139. (No specimens.) Patented in France May 7, 1884, No. 161,967; in Germany March 16, 1885, No. 31,509, and in England June 8, 1885, No. 7,645.

*To all whom it may concern:*

Be it known that I, HUGO HASSENCAMP, of Elberfeld, Prussia, Germany, have invented a new and useful Improvement in Dye-Stuffs, of which the following is a full, true, and exact description.

The sulpho-acids of the violet dye-stuffs, which are obtained by a direct sulphonation of the commercial violets yield but a small available product when manufactured, owing to the destructive action of the sulphuric acid at elevated temperatures, and the products obtained leave much to be desired in regard to the quality of the color and its other tinctorial qualities.

I have found that in a ready and simple way I can obtain an acid violet of a fine tinge, which is readily distinguishable from the dye-stuffs above alluded to.

In carrying out my process to produce my product practically, I proceed as follows: I reduce the methyl violet of commerce to a leuco base, benzylate this leuco base by treating with chloride of benzyl, ($C_{12}H_5CH_2Cl$,) convert the thus obtained benzylated leuco base into a sulpho-acid, and this again into the acid violet or the sulpho-acid of the dye-stuff by oxidation. As all these processes thus briefly described operate smoothly, more especially so the benzylated leuco base, and as the base of the color can be sulphonated with great ease without raising the temperature and with an exact quantitative yield without destruction of the action of the sulphuric acid, and as, moreover, the acid violet thus obtained is distinguished by a splendid bluish-violet shade, and as it possesses distinguishing tinctorial properties, it will be seen that a great advance has been made by this new manner of treatment.

In detail I proceed as follows:

1. *Reduction.*—The reduction of the methyl violet of commerce is done by means of zinc powder or similarly-acting agents, in accordance with the methods already known to chemists. For instance, I dissolve one hundred kilos dye-stuff in two hundred kilos acetic acid of seventy-five per cent. I thereupon add gradually to this solution while stirring fifteen kilos zinc powder, in which process the violet dye-stuff slowly disappears. The solution of the leuco base thus obtained is filtered, diluted with three hundred liters of water, and mixed with calcined soda until the leuco base has entirely precipitated, thereby leaving the zinc salts in solution. In order to purify the leuco base it is dissolved in diluted sulphuric acid. The solution is filtered and precipitated with an excess of ammonia.

2. *Benzylation.*—The benzylation of the leuco base is done by treatment with chloride of benzyl ($C_6H_5CH_2Cl$) and soda-lye. For instance, I proceed as follows: Fifty kilos leuco base are heated under pressure in a closed vessel provided with a stirring apparatus, with fifty kilos chloride of benzyl and an equivalent quantity of caustic soda (NaOH) which has been previously dissolved in five times as much water. The vessel is contained in an oil bath heated to 130° to 150° Celsius. The quantity of chloride of benzyl to be employed may, however, be considerably varied. In this process the benzyl group replaces both the free hydrogen atoms of the amido groups, and also the methyl groups, the last named of which split off in this process. The product of the reaction is boiled by means of steam, in order to purify it, for twelve hours.

3. *Sulphonation.*—The sulphonation of the thus obtained benzylated leuco base is done according to the well-known methods of sulphonation. For instance, I dissolve one hundred kilos dry benzylated leuco base in three hundred kilos sulphuric acid of 66° Baumé, and I add, while properly cooling, fuming sulphuric acid of 70° Elliot table or over, until traces of free sulphuric anhydride are seen, thereby the sulphonation is accomplished. The separation of the sulpho-acid is accomplished according to the well-known manner.

4. *Oxidation.*—The oxidation of the sulpho-acid as obtained by the last-named process is accomplished by the known process with peroxide of lead, ($PbO_2$,) manganese ore, ($MnO_2$,) permanganate of potash, ($KMnO_4$,) or similarly-acting oxidation bodies in an acid or alkaline solution. The sulpho-acid of the dye-stuff thus formed is introduced into commerce as a soda-salt.

The product thus produced may be distinguished by the following characteristics: The dye-stuff exists in lumps having a violet tint with a bronze luster, which are easily dissolved in warm water. Hitherto I have not obtained it in a crystallized condition. In a ground state it appears as a deep dark violet powder. Its water solution shows a color from bluish violet to blue, which, by the addition of alkali, assumes continually a purer blue tinge. By the addition of diluted mineral acid the color changes from a bluish violet to a pure violet color. The concentrated water solution is precipitated in traces by the addition of dilute sulphuric acid. Acetic acid does not produce this precipitation. Warmed with a little water, the powder melts in a splendid bronze-like bulk.

This dye-stuff is principally used for dyeing wool when sulphuric acid is used as a mordant, and dyes the wool a beautiful violet-blue shade, which very nearly approaches the 6B of the so-called "benzyl violet" of commerce. It can, moreover, be used in the dyeing of mordanted cotton.

The acid violet may further be used very well with mixed colors. It serves, in combination with acid green, as a substitute for carmine of indigo, with which important dye-stuff this mixture in its entire properties shows a very great similarity.

On account of the variations in chemical constitution of the methyl violets of commerce, I cannot state the exact chemical constitution of the product; but it is to be noticed that the benzyl groups are an essential part of the acid violet, and are to be considered as exclusively the supporters of the sulpho groups, and thus effect the entire character of the new dye-stuff.

What I claim as my invention, and desire to secure by Letters Patent, is—

The above-described process of manufacturing an acid violet, which consists in reducing the methyl violet of commerce to its leuco base, in the benzylation of the leuco base, in the transformation of the benzylated leuco base into its leuco-sulpho acid, and of finally obtaining the sulpho-acid of the dye-stuff by oxidation.

In testimony whereof I have signed my name to this specification in the presence of two subscribing witnesses.

HUGO HASSENCAMP.

Witnesses:
HERM. MATTHIS,
RICHARD LEKEBUSCH.